United States Patent
Ueda et al.

[11] Patent Number: 5,910,555
[45] Date of Patent: Jun. 8, 1999

[54] CURABLE RESIN COMPOSITION WITH IMPROVED ADHESION OF COATINGS

[75] Inventors: Kazuhiko Ueda, Kobe; Jun Kotani; Ayako Yano, both of Kakogawa; Toshifumi Hirose, Kobe, all of Japan

[73] Assignee: Kaneka Corporation, Osaka, Japan

[21] Appl. No.: 08/856,078

[22] Filed: May 14, 1997

[30] Foreign Application Priority Data

May 22, 1996 [JP] Japan .................................. 7-127135
May 16, 1996 [JP] Japan .................................. 7-121882

[51] Int. Cl.$^6$ .................................................. C08G 77/26
[52] U.S. Cl. .............................. 528/34; 528/38; 428/447; 427/387; 525/102
[58] Field of Search ........................ 528/34, 38; 428/447; 427/387; 525/102

[56] References Cited

U.S. PATENT DOCUMENTS

| | | | |
|---|---|---|---|
| 3,632,557 | 1/1972 | Brode et al. | 260/77.5 TB |
| 4,302,571 | 11/1981 | Arai et al. | 528/32 |
| 4,323,488 | 4/1982 | Takago et al. | 528/32 |
| 4,345,053 | 8/1982 | Rizk et al. | 525/440 |
| 4,366,307 | 12/1982 | Singh et al. | 528/373 |
| 4,593,068 | 6/1986 | Hirose et al. | 525/100 |
| 4,786,667 | 11/1988 | Shimizu et al. | 523/435 |
| 4,960,844 | 10/1990 | Singh | 528/75 |
| 4,983,700 | 1/1991 | Yukimoto et al. | 528/34 |
| 5,342,914 | 8/1994 | Iwakiri et al. | 528/32 |
| 5,541,266 | 7/1996 | Hasegawa et al. | 525/403 |

FOREIGN PATENT DOCUMENTS

| | | |
|---|---|---|
| 0 108 946 | 5/1984 | European Pat. Off. . |
| 0 159 715 | 10/1985 | European Pat. Off. . |
| 45-36319 | 11/1970 | Japan . |
| 46-12154 | 3/1971 | Japan . |
| 50-156599 | 12/1975 | Japan . |
| 54-006096 | 1/1979 | Japan . |
| 55-013468 | 1/1980 | Japan . |
| 55-013767 | 1/1980 | Japan . |
| 57164123 | 10/1982 | Japan . |
| 59078223 | 5/1984 | Japan . |
| 59122541 | 7/1984 | Japan . |
| 59168014 | 9/1984 | Japan . |
| 60228517 | 11/1985 | Japan . |
| 61197631 | 9/1986 | Japan . |
| 61215622 | 9/1986 | Japan . |
| 61215623 | 9/1986 | Japan . |
| 61218632 | 9/1986 | Japan . |
| 63112642 | 5/1988 | Japan . |
| 302450 | 1/1991 | Japan . |
| 6172631 | 6/1994 | Japan . |

*Primary Examiner*—Margaret W. Glass
*Attorney, Agent, or Firm*—Foley & Lardner

[57] ABSTRACT

A curable resin composition containing an oxyalkylene polymer having at least one silicon-containing reactive group in a molecule, and at least one compound selected from the group consisting of (1) a compound having at least one amino group and at least one trialkylsiloxy group in a molecule and (2) a silylamine derivative having at least one group with a hydroxy or hydrolyzable group bonded to the silicon atom and can be crosslinked through the formation of a siloxane bond, which provides a cured material having good adhesion properties with coatings and less residual tack.

15 Claims, No Drawings

CURABLE RESIN COMPOSITION WITH IMPROVED ADHESION OF COATINGS

BACKGROUND OF THE INVENTION

1. Field of the Invention

The present invention relates to a room temperature-curable resin composition, a cured material of which has good residual tack on its surface, and improved adhesion of coatings which are applied on the surface of the cured material, and a method for improving the adhesion of coatings to a cured material of a curable resin composition.

2. Description of the Prior Art

A group which has a hydroxy or hydrolyzable group bonded to a silicon atom and is crosslinked through the formation of a siloxane bond (hereinafter referred to as "silicon-containing reactive group) means a group which is hydrolyzed with water in an air and generates a siloxane bond (Si—O—Si) through —Si(OH)$_3$, etc. with a silanol condensation reaction with other silicon-containing reactive group. A typical example of the silicon-containing reactive group is one represented by the formula: —Si(OCH$_3$)$_3$, which forms the siloxane bond as follows:

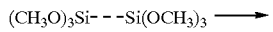

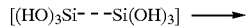

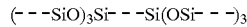

Thus, polymers having the silicon-containing reactive groups are crosslinked and cured in the presence of moisture even at a room temperature.

Among such the polymers, those comprising oxyalkylene polymer backbones such as polyoxypropylene backbones are widely used as construction sealing materials, industrial sealing materials and the like by making the use of their properties that they are highly viscous liquids at a room temperature and cured to provide a rubbery elastomers.

The sealing materials are filled in gaps between construction materials such as wall panels or tiles and cured, and cured materials stop up the gaps for maintaining water- and air-tightness.

In some cases, it is desired to apply coatings on the surface of the cured material, but the adhesion between the coatings and the surfaces of the cured sealing materials is insufficient, particularly when solvent type-coatings are used. In addition, the surfaces of the cured materials have slight tackiness, that is, residual tack, and therefore contaminated with dusts and the like.

SUMMARY OF THE INVENTION

An object of the present invention is to provide a curable, resin composition comprising an oxyalkylene polymer having a silicon-containing reactive group, a cured material of which has no or little residual tack, and provides high adhesion between the surface of the cured material and coatings which are applied on the surface of the cured material.

Accordingly, the present invention provides a curable resin composition comprising:

(a) an oxyalkylene polymer having at least one silicon-containing reactive group in a molecule, and (b) at least one compound selected from the group consisting of (b-1) a compound having at least one amino group and at least one trialkylsiloxy group in a molecule and (b-2) a silylamine derivative having at least one group which has a hydroxy or hydrolyzable group bonded to the silicon atom and can be crosslinked through the formation of a siloxane bond.

The cured material of the resin composition of the present invention has excellent adhesion properties with coatings, and less residual tack on its surface.

Furthermore, the present invention provides a method for improving application properties of coatings on the surface of a cured material of a curable resin composition comprising an oxyalkylene polymer, characterized in that the curable resin composition comprising:

(a) an oxyalkylene polymer having at least one silicon-containing reactive group in a molecule, and (b) at least one compound selected from the group consisting of (b-1) a compound having at least one amino group and at. least one trialkylsiloxy group in a molecule and (b-2) a silylamine derivative having at least one group which has a hydroxy or hydrolyzable group bonded to the silicon atom and can be crosslinked through the formation of a siloxane bond is used as the curable resin composition.

DETAILED DESCRIPTION OF THE INVENTION

The backbone of the oxyalkylene polymer having at least one silicon-containing reactive group in a molecule substantially comprises a repeating unit of the formula (I):

$$—R^1—O—  \quad\quad (I)$$

wherein R$^1$ is a divalent organic group.

R$^1$ in the formula (I) is preferably a straight or branched alkylene group having 1 to 14 carbon atoms, in particular, 2 to 4 carbon atoms. Specific examples of the repeating unit of the formula (I) are —CH$_2$O—, —CH$_2$CH$_2$O—, —CH$_2$CH(CH$_3$)O—, —CH$_2$CH(C$_2$H$_5$)O—, —CH$_2$C(CH$_3$)$_2$O—, —CH$_2$CH$_2$CH$_2$CH$_2$O—, and the like.

The backbone of the oxyalkylene polymer may consist of a single kind of repeating unit, or may comprise two or more kinds of repeating units. In particular, a polymer comprising propylene-oxide is preferable.

The silicon-containing reactive group in the polymer (a) is a group which has a hydroxyl or hydrolyzable group bonded to the silicon atom and can be crosslinked through the formation of the siloxane bond. A typical example of such the group is a group represented by the formula (II):

wherein R$^2$ and R$^3$ are each an alkyl group having 1 to 20 carbon atoms, a cycloalkyl group having 3 to 20 Carbon atoms, an aryl group having 6 to 20 carbon atoms, an aralkyl group having 7 to 20 carbon atoms or a triorganosiloxy group of the formula:

in which each R$^4$ is a monovalent hydrocarbon group having 1 to 20 carbon atoms and three R$^4$ groups may be the same or different, provided that, when two or more R$^2$ or R$^3$ groups are present, they may be the same or different; each X is a hydroxyl or hydrolyzable group, provided that when two or more X groups are present, they may be the same or different; a is 0, 1 or 2; b is 0, 1, 2 or 3; and p is an integer of 0 to 19; with the proviso that "a" in the different repeating unit of the formula :

$$SiR^2{}_{2-a}X_aO \qquad (III)$$

in the brackets may be the same or different, and the sum of all "a" and "b" is no less than 1.

The hydrolyzable group represented by X is not limited and may be any known hydrolyzable group. Specific examples of the hydrolyzable group are a hydrogen atom, a halogen atom, an alkoxy group, an acyloxy group, a ketoximate group, an amino group, an amido group, an acid amide group, an aminoxy group, a mercapto group, an alkenyloxy group, and the like. Among them, a hydrogen atom, an alkoxyl group, an acyloxy group, a ketoximate group, an amino group, an amido group, an aminoxy group, a mercapto group and an alkenyloxy group are preferable. In particular, an alkoxy group is preferable since it has mild hydrolyzing properties and easily treated.

One, two or three hydrolyzable or hydroxyl groups can be bonded to one silicon atom, and the sum of all "a" and "b" is preferably between 1 and 5. When two or more hydrolyzable or hydroxyl groups are bonded to one silicon-containing reactive group, they may be the same or different.

The silicon-containing reactive group may contain one or more silicon atoms. The number of the silicon atoms may be around 20 or more, when the silicon atoms are bonded through the siloxane bond and the like.

A silicon-containing reactive group of the formula (IV)

$$—SiR^3{}_{3-a}X_b \qquad (IV)$$

wherein $R^3$, X and b are the same as defined above is preferably because of easy availability.

Specific examples of $R^2$ and $R^3$ in the formulas (II), (III) and (IV) are alkyl groups such as a methyl or ethyl group; cycloalkyl groups such as a cyclohexyl group; aryl groups such as a phenyl group; aralkyl groups such as a benzyl group; and triorganosiloxy groups such as a group of the formula: $R^4{}_3SiO$— in which $R^4$ is a methyl or phenyl group. In particular, a methyl group is preferable.

The silicon-containing reactive group may be introduced in the polymer chains by a conventional method. The following methods are preferably employed:

(i) An oxyalkylene polymer having a functional group such as a hydroxyl group in a molecule is reacted with an organic compound having an unsaturated group and an active group reactive with the functional group of the oxyalkylene polymer, and the oxyalkylene polymer having the unsaturated group is obtained. Alternatively, an oxyalkylene is copolymerized with an epoxy compound having an unsaturated group, and the oxyalkylene polymer having the unsaturated group is obtained. Then, the obtained polymer is hydrosilylated through the reaction with a hydrosilane having a silicon-containing reactive group.

(ii) The oxyalkylene polymer having the unsaturated group, which is prepared in the same manner as in the method (i), is reacted with a compound having a mercapto group and a silicon-containing reactive group.

(iii) An oxyalkylene polymer having a functional group such as a hydroxyl, epoxy or isocyanate group in a molecule is reacted with a compound having a silicon-containing reactive group and a functional group reactive with the functional group of the oxyalkylene polymer.

Among the above methods, the method (i) and the method (iii) in which a polymer having a terminal hydroxyl group is reacted with a compound having a silicon-containing reactive group and an isocyanate group are preferable.

The polymer (a) may be a straight or branched one, and has a molecular weight of between about 500 and 50,000, preferably between 1000 and 30,000. The polymer has at least one, preferably 1.1 to 6 silicon-containing reactive groups on the average in a molecule. When the number of silicon-containing reactive group in a molecule is less than 1 on the average, the polymer has insufficient curability. When the number of silicon-containing reactive group is too large, the formed network structure becomes too dense, and therefore the crosslinked polymer does not have good mechanical properties.

Specific examples of the oxyalkylene polymer (a) are, those disclosed in JP-B-45-36319, JP-B-46-12154, JP-A-50-156599, JP-A-54-6096, JP-A-55-13767, JP-A-55-13468, JP-A-57-164123, JP-B-3-2450, U.S. Pat. No. 3,632,557, U.S. Pat. No. 4,345,053, U.S. Pat. No. 4,366,307 and U.S. Pat. No. 4,960,844, the disclosures of which U.S. Patents are hereby incorporated by reference; high molecular weight oxyalkylene polymers having a number average molecular weight of at least 6000 and a narrow molecular weight distribution of Mw/Mn of 1.6 or less which are disclosed in JP-A-61-197631, JP-A-61-215622, JP-A-61-215623 and JP-A-61-218632.

The oxyalkylene polymers having the silicon-containing reactive group may be used independently or in admixture of two or more of them. A vinyl polymer having a silicon-containing reactive group may be blended with the oxyalkylene polymer (a).

Methods for blending the oxyalkylene polymer (a) and the vinyl polymer having the silicon-containing reactive group are disclosed in JP-A-59-122541, JP-A-63-112642, JP-A-6-172631 and U.S. Pat. No. 4,693,068 the disclosure of which is hereby incorporated by reference. A preferable method comprises blending the oxyalkylene polymer having the silicon-containing reactive group with a copolymer which has a silicon-containing reactive group and a polymer chain of which comprises substantially an acrylate and/or methacrylate monomeric unit having a $C_1$–$C_8$ alkyl group of the formula (V):

$$—CH_2—C(R^6)(COOR^5)— \qquad (V)$$

wherein $R^5$ is an alkyl group having 1 to 8 carbon atoms, and $R^6$ is a hydrogen atom or a methyl group and an acrylate and/or methacrylate monomeric unit having an alkyl group with at least 10 carbon atoms of the formula (VI):

$$—CH_2—C(R^6)(COOR^7)— \qquad (VI)$$

wherein $R^6$ is the same as defined above, and $R^7$ is an alkyl group having at least 10 carbon atoms.

Examples of the alkyl group $R^5$ in the formula (V) are alkyl groups having 1 to 8, preferably 1 to 4, more preferably 1 or 2 carbon atoms, such as a methyl, ethyl, propyl, n-butyl, tert.-butyl or 2-ethylhexyl group. The polymer may contain one kind of alkyl group or two ore more kind of alkyl groups for $R^5$.

Examples of the alkyl group $R^7$ in the formula (VI) are alkyl groups having at least 10, preferably 10 to 30, more preferably 10 to 20 carbon atoms, such as a lauryl, tridecyl, cetyl or stearyl group and a $C_{22}$ alkyl group. The polymer may contain one kind of alkyl group or two ore more kind of alkyl groups for $R^7$.

The polymer chain of the vinyl polymer comprises substantially the monomeric units of the formulas (V) and (VI). Herein, the term "comprising substantially" means that the total amount of the monomeric units of the formulas (V) and (VI) exceeds 50 wt. % of the copolymer. Preferably, the total amount of the monomeric units of the formulas (V) and (VI) is at least 70 wt. %.

The weight ratio of the monomeric unit of the formula (V) to that of the formula (VI) is preferably between 95:5 and 40:60, more preferably between 90:10 and 60:40.

The copolymer may comprise a monomeric unit other than those of the formulas (V) and (VI). Examples of such the other monomeric unit are those derived from acrylic acids such as acrylic acid, methacrylic acid, etc.; monomers having an amido group (e.g. acrylamide, methacrylamide, N-methylolacrylamide, N-methylol-methacrylamide, etc.), an epoxy group (e.g. glycidyl acrylate, glycidyl methacrylate, etc.), or an amino group (e.g. diethylaminoethyl acrylate, diethylaminoethyl methacrylate, aminoethyl vinyl ether, etc.); acrylonitrile, styrene, α-methylstyrene, alkyl vinyl ethers, vinyl chloride, vinyl acetate, vinyl propionate, ethylene, and the like.

The number average molecular weight of the copolymer is preferably between 500 and 100,000 because of easy handling.

Examples of the silicon-containing reactive group contained in the copolymer are the same as those represented by the formulas (II) and (IV).

The mean number of the silicon-containing reactive group in a molecule of the polymer is at least 1, preferably at least 1.1, more preferably at least 1.5 for attaining the sufficient curing properties. Preferably, the copolymer has the silicon-containing reactive groups so that an apparent number average molecular weight of the polymer per one silicon-containing reactive group is between 300 and 4000.

In addition to the above method, the oxyalkylene polymer which is blended with the vinyl polymer having the silicon-containing reactive group can be prepared by polymerizing a (meth)acrylate monomer in the presence of the oxyalkylene polymer having the silicon-containing reactive group. This method is disclosed in JP-A-59-78223, JP-A-59-168104, JP-A-60-228651 and JP-A-60-228517.

A typical example of the compound having at least one amino group and at least one trialkylsiloxy group in a molecule (b-1) is a compound of the formula (VII):

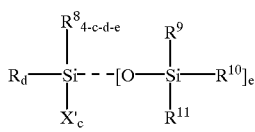

(VII)

wherein R is an alkyl group having an amino group and 1 to 20 carbon atoms; $R^8$ is an alkyl group having 1 to 20 carbon atoms, an aryl group having 6 to 20 carbon atoms, an aralkyl group having 7 to 20 carbon atoms or a triorganosiloxy group of the formula:

in which $R^4$ is the same as defined above, provided that when two or more $R^8$ groups are present, they may be the same or different; X' is a hydroxyl or hydrolyzable group or a group of the formula:

in which Q is a hydroxyl or hydrolyzable group, a substituted or unsubstituted monovalent organic group having 1 to 20 carbon atoms or a triorganosiloxy group, provided that at least one of three Q groups is a hydroxyl or hydrolyzable group; $R^9$, $R^{10}$ and $R^{11}$ represent independently one another a substituted or unsubstituted alkyl group having 1 to 6 carbon atoms or a phenyl group: c is the same as defined above; d and e are each 1 or 2.

Specific examples of the compound of the formula (VII) are γ-aminopropyltrimethylsiloxydiethoxysilane, N-(β-aminoethyl)-γ-aminopropyltrimethylsiloxydimethoxysilane, N-(β-aminoethyl)-γ-aminopropyltrimethylsiloxymethylmethoxysilane, diethylene-triaminoproyltrimethylsiloxydimethoxysilane, N,N-dimethyl-γ-aminopropyltrimethylsiloxydimethoxysilane, and the like.

These compounds may be easily prepared by reacting a trialkylsilanol compound and a silane-containing compound having at least one amino group and at least one hydrolyzable group in a molecule.

Specific examples of the silane-containing compound having at least one amino group and at least one hydrolyzable group in a molecule are γ-aminopropyltriethoxysilane (A-1100 (trade name) available from NIPPON UNICAR) N-(β-aminoethyl)-γ-amino-propyltrimethoxysilane (A-1120 (trade name) available from NIPPON UNICAR), N-(β-aminoethyl)-γ-aminopropylmethyldimethoxysilane (KBM-602 (trade name) available from SHINETSU CHEMICAL INDUSTRIES), diethylenetriaminopropyltrimethoxysilane (A-1130 (trade name) available from NIPPON UNICAR), N,N-dimethyl-γ-aminopropyltrimethoxysilane (D5200 (trade name) available from CHISSO), N,N'-bis[γ-trimethoxysilylpropyl]ethylenediamine (XS 1003 available from CHISSO), N-benzyl-γ-aminopropyltrimethoxysilane (X-12-612 (trade name) available from SHINETSU CHEMICAL INDUSTRIES), N-phenyl-γ-aminopropyltrimethoxysilane (KBM 573 (trade name) available from SHINETSU CHEMICAL INDUSTRIES), and the like.

Examples of the trialkylsilanol compound are trimethylsilanol, triethylsilanol, triphenylsilanol, and the like.

The silylamine derivative having at least one silicon-containing reactive group (b-2) is a compound having a silicon-containing reactive group and an amino group substituted with a silicon-containing group to one silicon atom of which three hydrogen atoms or hydrocarbon groups are bonded.

A typical example of such the compound is a compound of the formula (VII):

(VIII)

wherein $R^3$, X and b are the same as defined above, $R^{12}$ is a hydrogen atom, a substituted or unsubstituted alkyl group having 1 to 20 carbon atoms, a substituted or unsubstituted cycloalkyl group having 3 to 20 carbon atoms, an aryl group having 6 to 20 carbon atoms or an aralkyl group having 7 to 20 carbon atoms, provided that three $R^{12}$ groups may be the same or different; $R^{13}$ is a hydrogen atom, a substituted or unsubstituted alkyl group having 1 to 20 carbon atoms, a substituted or unsubstituted cycloalkyl group having 3 to 20 carbon atoms, an aryl group having 6 to 20 carbon atoms or an aralkyl group having 7 to 20 carbon atoms; and $R^{14}$ is a substituted or unsubstituted divalent hydrocarbon group.

Examples of the alkyl, aryl and aralkyl groups for $R^{12}$ and $R^{13}$ are alkyl groups having 1 to 6 carbon atoms such as a methyl or ethyl group; cycloalkyl groups having 3 to 20 carbon atoms such as a cyclohexyl group; aryl groups having 6 to 20 carbon atoms such as a phenyl group; and aralkyl groups having 7 to 20 carbon atoms such as a benzyl group. Among them, a methyl group is preferable.

Examples of the divalent hydrocarbon group for $R^{14}$ are —$CH_2$—, —$CH_2CH_2$—, —$CH_2CH_2CH_2$—, —$CH_2CH$ $(CH_3)$—, —$CH_2CH(C_2H_5)$—, —$CH_2C(CH_3)_2$—, —$CH_2CH_2CH_2CH_2$—, and the like.

Specific examples of the silylamine compound having the silicon-containing reactive group are $Me_3SiNHC_3H_6Si(OEt)_3$, $Me_3SiNHC_3H_6Si(OMe)_3$, $Me_3SiNHC_2H_4NHC_3H_6Si(OMe)_3$, $Me_3SiNHC_2H_4N(SiMe_3)C_3H_6Si(OMe)_3$, $Me_3SiNHC_2H_4NHC_3H_6SiMe(OMe)_2$, $Me_3SiNHC_2H_4N(SiMe_3)C_3H_6SiMe(OMe)_2$, $Me_3SiNHC_2H_4NHC_2H_4NHC_3H_6Si(OMe)_3$, $Me_3SiNHC_2H_4N(SiMe_3)C_2H_4NHC_3H_6Si(OMe)_3$, $Me_3SiNHC_2H_4N(SiMe_3)C_2H_4N(SiMe_3)C_3H_6Si(OMe)_3$, $Me_3SiN(CH_2Ph)C_3H_6Si(OMe)_3$, $Me_3SiN(Ph)C_3H_6Si(OMe)_3$, $(MeO)_3SiC_3H_6N(SiMe_3)C_2H_4NHC_3H_6Si(OMe)_3$, $(MeO)_3SiC_3H_6N(SiMe_3)C_2H_4N(SiMe_3)C_3H_6Si(OMe)_3$, and the like.

The amount of the compound (b) selected from the compound having the amino group and the trialkylsiloxy group (b-1) and the silylamine compound having the silicon-containing reactive group (b-2) is preferably between 0.1 and 10 wt. parts per 100 wt. parts of the oxyalkylene polymer (a). When the amount of the compound (b) is less than 0.1 wt. parts, the effects of the present invention may not be attained. The amount of the compound (b) exceeding 10 wt. parts is economically disadvantageous.

The resin composition of the present invention may contain various plasticizers, if necessary. The total amount of the plasticizer(s) is preferably between 0.1 and 150 wt. parts per 100 wt. parts of the oxyalkylene polymer (a).

Examples of the plasticizers are phthalates (e.g. dioctyl phthalate, diisodecyl phthalate, dibutyl phthalate, butylbenzyl phthalate, etc.), epoxy group-containing plasticizers (e.g. epoxidized soybean oil, epoxidized linseed oil, benzyl epoxystearate, etc.), polyester plasticizers (e.g. polyesters of dibasic acids and dihydric alcohols), polyethers (e.g. polypropylene glycol and its derivatives), polystyrenes (e.g. poly-α-methylstyrene, polystyrene, etc.), polybutadiene, butadiene-acrylonitrile copolymer, polychloroprene, polyisoprene, polybutene, chlorinated paraffins, and their mixtures.

The resin composition of the present invention may contain a silanol condensation catalyst for facilitating the reaction of the silicon-containing reactive group. Examples of the silanol condensation catalyst are titanates (e.g. tetrabutyl titanate, tetrapropyl titanate, etc.); organic tin compounds (e.g. dibutyltin dilaurate, dibutyltin maleate, dibutyltin diacetate, tin octylate, tin naphthenate, reaction products of dibutyltin oxide and phthalates, dibutyltin diacetylacetonate, etc.); organic aluminum compounds (e.g. aluminum trisacetylacatonate, aluminum trisethylacetoacetate, diisopropoxyaluminum ethylacetoacetate, etc.); reaction products of bismuth salts and carboxylic acids (e.g. bismuth-tris(2-ethylhexanoate), bismuth-tris(neodecanoate), etc.); chelate compounds (e.g. zirconium tetraacetylacetonate, titanium tetraacetylacetonate, etc.); organic lead compounds (e.g. lead octylate, etc.); organic vanadium compounds; amine compounds (e.g. butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, 1,8-diazabicyclo[5.4.O]undecene-7 (DBU), etc.) and their salts with carboxylic acids; low molecular weight polyamide resins obtained from polybasic acids and excessive polyamines; reaction products of epoxy compounds and excessive polyamines; and the like.

In addition to the above silanol condensation catalysts, any conventional condensation catalyst may be used.

The silanol condensation catalysts may be used independently or in admixture of two or more of them.

Among these silanol condensation catalysts, the organic metal compounds and combinations of the organic metal compounds and the amine compounds are preferable in view of the curing properties of the composition.

The amount of the silanol condensation catalyst is preferably between 0.01 and 20 wt. parts, more preferably between 0.1 and 10 wt. parts, per 100 wt. parts of the oxyalkylene polymer (a). When the amount of the silanol condensation catalyst is too small in relation to the amount of the oxyalkylene polymer (a), the curing rate decreases and the curing reaction may not proceed sufficiently. When the amount of the silanol condensation catalyst is too large in relation to the amount of the oxyalkylene polymer (a), the resin composition generates heat locally or forms bubbles, and a good cured material may not be obtained.

The resin composition of the present invention may optionally contain various additives such as dehydrating agents, compatibilizers, adhesion-improvers, property-adjusters, storage stability-improvers, fillers, anti-aging agents, UV light absorbers, metal deactivators, antiozonants, light stabilizers, amine-base inhibitors for radical chain transfer, phosphorus peroxide-decomposers, lubricants, pigments, blowing agents, flame-retardants, antistatic agent, silane compounds, and the like.

Examples of the fillers are wood meal, walnut shell flour, rice hull, pulp, cotton flock, mica, graphite, diatomaceous earth, china clay, kaolin, clay, talc, fumed silica, precipitated silica (hydrogel), silica (silicic anhydrous), quartz powder, glass beads, calcium carbonate, Magnesium carbonate, titanium oxide, aluminum powder, zinc powder, asbestos, glass fiber, carbon fiber, and the like. They may be used independently or in admixture of two or more of them.

The amount of the filler is preferably between 1 and 200 wt. parts, more preferably between 10 and 150 wt. parts per 100 wt. parts of the oxyalkylene polymer (a).

The resin composition of the present invention may contain other polymer having a silicon-containing reactive group such as polydimethylsiloxane, in addition to the oxyalkylene polymer (a).

The resin composition of the present invention comprising the oxyalkylene polymer (a) and the compound (b) can be prepared by any conventional method. For example, the compound (b) is added to and homogeneously dispersed in the oxyalkylene polymer (a) with adjusting mixing conditions adequately. A dispersant may be used, if necessary. Alternatively, the components are dissolved and mixed with a mixer, rolls, a kneader, and the like.

The properties of the cured material of the resin composition of the present invention are not limited. Preferably, the curable composition provides a cured material having a 100% tensile modulus of at least 0.5 MPa, because good adhesion of the coatings to the cured material is achieved without deteriorating other mechanical properties.

The resin composition of the present invention may be formulated in the form of a one-pack or two-pack type curable composition. The one-pack type curable composition can be obtained by preparing the composition of the present invention in the absence of water. It can be stored for a long time when it is stored in a sealed vessel, and starts to cure from its surface once it is exposed to an air.

The curable resin composition of the present invention is useful as an elastic sealing material in the fields of buildings, constructions or other industries, and also used as coatings, adhesives, impregnants, covering materials, and the like.

The present invention will be explained in greater detail by the following examples, which do not limit the scope of the invention.

EXAMPLE 1

A propyleneoxide polymer having 2.1 methyldimethoxysilyl groups (—Si(CH$_3$)(OCH$_3$)$_2$) on the average per one molecule and a number average molecular weight of 17,000 (100 wt. parts), diisodecyl phthalate (DIDP) as a plasticizer (55 wt. parts), surface-treated colloidal calcium carbonate as a filler (120 wt. parts), and titanium oxide (20 wt. parts) were added into a closable kneader (a planetary mixer). Furthermore, an aliphatic amide wax as an anti-sagging agent (2 wt. parts), a UV light absorber (1 wt. part) and a light-stabilizer (1 wt. part) were added. Then, the mixture was stirred and dehydrated in vacuo at 120° C. for 2 hours.

After cooling to a room temperature, vinyltrimethoxysilane as a viscosity-stabilizer (2 wt. parts), U-220 (available from NITTO CHEMICALS) as a curing catalyst (2 wt. parts) and N-(β-aminoethyl)-γ-aminopropyltrimethylsiloxydimethoxysilane as a surface-modifier (3 wt. parts) were further added to the mixture and mixed at a room temperature.

The obtained mixture was filled in a closed vessel, and a one-pack type curable composition was obtained.

EXAMPLES 2 AND 3

A curable composition was prepared in the same manner as in Example 1 except that N-(β-aminoethyl)-γ-aminopropyl-trimethylsiloxydimethoxysilane was used in an amount shown in Table 1 and additionally N-(β-aminoethyl)-γ-aminopropyltrimethoxysilane (A-1 120) (1 wt. part) was used.

COMPARATIVE EXAMPLES 1 AND 2

A curable composition was prepared in the same manner as in Example 1 except that N-(β-aminoethyl)-γ-aminopropyl-trimethoxysilane (A-120) was used in an amount shown in Table 1 in place of N-(β-aminoethyl)-γ-aminopropyltrimethylsiloxydimethoxysilane.

The compositions obtained in Examples 1, 2 and 3 and Comparative Examples 1 and 2 were subjected to the following evaluation tests Just after the preparation and after storing it at 50° C. for 14 days.

Each composition was spread over a polyethylene film to a thickness of 3 mm and kept at 23° C., 55% RH for curing. After one day, each of five commercially sold solvent type acrylic coatings for industrial use (three acryl urethane type coatings, one acrylic lacquer and one acryl enamel) was applied with a brush on the surface of the cured material. After 7 days from the application, the samples were subjected to the cross-cut test using an adhesive tape (available from NICHIBAN) with cutting the coating at a distance of 2 mm (25 cells). The degree of adhesion of the coating to the cured material was expressed by a percentage (%) of the number of cells remaining on the cured material per 125 calls (25 cells×5 coatings).

The residual tack was evaluated as follows:

Each composition after storage was spread to a thickness of 3 mm and cured at 23° C., 55% RH for 1 day or 7 days. Then, the surface was touched with a finger and the residual tack was evaluated according to the following criteria:
A: Substantially no sticking
B: Slight sticking
C: Sticking
D: Not cured Furthermore, the tensile properties (100% tensile modulus, tensile strength at break and elongation at break) ware measured according to JIS K 6251.

Samples for the tensile were prepared from each composition in the form of a No. 3 dumbbell according to JIS K 6251.

The results are shown in Table 1.

TABLE 1

| Example No. | 1 | 2 | 3 | C.1 | C.2 |
|---|---|---|---|---|---|
| N-(β-aminoethyl)-γ-aminopropyltrimethylsiloxydimethoxysilane (wt. parts) | 3 | 3 | 4 | — | — |
| A-1120 (wt. parts) | — | 1 | 1 | 3 | 5 |
| Original adhesion (%) | 71 | 90 | 90 | 6 | 6 |
| Adhesion after storage (%) | 40 | 74 | 79 | 38 | 44 |
| Residual tack after 1 day | A | A | A | A-B | A-B |
| Residual tack after 7 days | A | A | A | A | A |
| 100% tensile modulus (MPa) | 0.80 | 0.76 | 0.83 | 0.89 | 0.92 |
| Tensile strength at break (MPa) | 2.34 | 2.38 | 2.22 | 2.40 | 2.21 |
| Elongation at break (%) | 590 | 520 | 430 | 470 | 430 |

As seen from the results in Table 1 the curable resin compositions of the present invention (Examples 1, 2 and 3) have good residual tack and improved adhesion of the coatings to the cured materials.

EXAMPLES 4–8

A propyleneoxide polymer having 2.1 methyldimethoxysilyl groups (—Si(CH$_3$)(OCH$_3$)$_2$) on the average per one molecule and a number average molecular weight of 17,000 (100 wt. parts), diisodecyl phthalate (DIDP) as a plasticizer (55 wt. parts), surface-treated colloidal calcium carbonate as a filler (120 wt. parts), titanium oxide (20 wt. parts), an aliphatic amide wax as an anti-sagging agent (2 wt. parts), a UV light absorber (1 wt. part) and a light-stabilizer (1 wt. part) were added to a mixer. Furthermore, vinyltrimethoxysilane as a viscosity-stabilizer (2 wt. parts), U-220 (available from NITTO CHEMICALS) as a curing catalyst (2 wt. parts) and a silane compound having at least one amino group and at least one trialkylsiloxy group in a molecule which is shown in Table 2 were added to the mixture and mixed at a room temperature.

In Examples 4–8, the dehydration in vacuo was not effected, and the obtained composition was not filled in the closed vessel unlike Examples 1–3.

COMPARATIVE EXAMPLES 3 AND 4

A curable composition was prepared in the same manner as in Examples 4–8 except that no N-(β-aminoethyl)-γ-aminopropyl-trimethylsiloxydimethoxysilane was used (Comparative Example 4) or N-(β-aminoethyl)-γ-aminopropyltrimethoxysilane (A-1120) was used in place of N-(β-aminoethyl)-γ-aminopropyltrimethylsiloxydimethoxysilane (Comparative Example 3).

The composition obtained in each of Examples 4–8 and Comparative Examples 3 and 4 was spread to a thickness of 3 mm and kept at 23° C., 55% RH for during. After one day, each of five commercially sold solvent type acrylic coatings which are the same as those used in Examples 1–3 was applied on the surface of the cured material.

After 7 days from the application of the coatings, the cross-cut test was carried out in the same manner as in Examples 1–3.

The residual tack and tensile properties were measured in the same manners as in Examples 1–3.

The results are shown in Table 2.

TABLE 2

| Example No. | 4 | 5 | 6 | 7 | 8 | C.3 | C.4 |
|---|---|---|---|---|---|---|---|
| N-(β-amino-ethyl)-γ-aminopropyltrimethylsiloxydimethoxysilane (wt. parts) | 3 | — | — | 2.5 | 1.5 | — | — |
| γ-Aminopropyl-trimethylsiloxydiethoxysilane (wt. parts) | — | 3 | — | — | — | — | — |
| N,N-Dimethyl-γ-aminopropyl-trimethylsiloxydimethoxysilane (wt. parts) | — | — | 3 | — | — | — | — |
| A-1120 | — | — | — | 3 | 3 | 3 | — |
| Adhesion (%) | 90 | 74 | 99 | 74 | 71 | 0 | 0 |
| Residual tack after 1 day | A | A | A-B | A | A-B | A-B | B |
| Residual tack after 2 days | A | A | A | A | A | A-B | A-B |
| 100% tensile modulus (MPa) | 0.60 | 0.48 | 0.23 | 0.74 | 0.71 | 0.75 | 0.45 |
| Tensile strength at break (MPa) | 2.11 | 1.94 | 1.21 | 2.41 | 2.39 | 2.39 | 1.49 |
| Elongation at break (%) | 520 | 630 | 780 | 450 | 470 | 460 | 560 |

EXAMPLE 9 AND COMPARATIVE EXAMPLE 5

U-220 (available from NITTO CHEMICALS) as a curing catalyst (2 wt. parts) and N-(β-aminoethyl)-γ-aminopropyltrimethylsiloxydimethoxysilane (Example 9) or N-(β-aminoethyl)-γ-aminopropyltrimethoxysilane (A-1120) (Comparative Example 5) as a surface modifier (3 wt. parts) were added to a propyleneoxide polymer having 2.1 methyldimethoxysilyl groups ($-Si(CH_3)(OCH_3)_2$) on the average per one molecule and a number average molecular weight of 17,000 (100 wt. parts), and stirred at a room temperature.

The obtained composition was spread to a thickness of 3 mm and kept at 23° C., 55% RH for curing. After one day, each of five commercially sold solvent type acrylic coatings which are the same as those used in Examples 1–3 was applied on the surface of the cured material.

After 7 days from the application of the coatings, the cross-cut test was carried out in the same manner as in Examples 1–3.

The residual tack and tensile properties were measured in the same manners as in Examples 1–3.

The results are shown in Table 3.

TABLE 3

| Example No. | 9 | C.5 |
|---|---|---|
| N-(β-aminoethyl)-γ-aminopropyltrimethylsiloxydimethoxysilane | 3 | — |
| A-1120 | — | 3 |
| Adhesion (%) | 75 | 0 |
| Residual tack after one day | A-B | B |
| 100% tensile modulus (MPa) | 0.34 | 0.50 |

TABLE 3-continued

| Example No. | 9 | C.5 |
|---|---|---|
| Tensile strength at break (MPa) | 0.47 | 0.57 |
| Elongation at break (%) | 90 | 130 |

EXAMPLES 10 AND 11

A propyleneoxide polymer having 2.1 methyldimethoxysilyl groups ($-Si(CH_3)(OCH_3)_2$) on the average per one molecule and a number average molecular weight of 17,000 (100 wt. parts), diisodecyl phthalate (DIDP) as a plasticizer (55 wt. parts), surface-treated colloidal calcium carbonate as a filler (100 wt. parts), titanium oxide (20 wt. parts), an aliphatic amide wax as an anti-sagging agent (2 wt. parts), a UV light absorber (1 wt. part), a light-stabilizer (1 wt. part), $Me_3SiNHC_2H_4N(SiMe_3)C_3H_6Si(OMe)_3$ (SILYLAMINE A) (1 or 5 wt. parts) and U-220 (available from NITTO CHEMICALS) as a curing catalyst (2 wt. parts) were thoroughly kneaded, and then passed through a three-roll paint roll three times, and a curable composition is obtained.

Properties of the composition were measured and evaluated in the same manners as in the previous Examples. The results are shown in Table 4.

EXAMPLES 12, 13 AND 14

A curable composition was prepared in the same manner as in Example 10 except that $(MeO)_3SiC_3H_6N(SiMe_3)C_2H_4N(SiMe_3)C_3H_6Si(OMe)3$ (SILYLAMINE B) (3 wt. parts) (Example 12), $Me_3SiN(CH_2Ph)C_3H_6Si(OMe)_3$ (SILYLAMINE C) (4 wt. parts) (Example 13) or $Me_3SiN(Ph)C_3H_6Si(OMe)_3$ (SILYLAMINE D) (4 wt. parts) (Example 14) was used in place of SILYLAMINE A, and its properties were measured and evaluated. The results are shown in Table 4.

COMPARATIVE EXAMPLES 6, 7 AND 8

A curable composition was prepared in the same manner as in Example 10 except that no silylamine having a silyl group was used, or N-(β-aminoethyl)-γ-aminopropyltrimethoxysilane (A-1120) (3 wt. parts) or N,N'-bis[3-(trimethoxysilyl)propyl]ethylene diamine (AMINE A) (3 wt. parts) was used in place of SILYLAMINE A, and its properties were measured and evaluated in the same manners as in the previous Examples. The results are shown in Table 4.

TABLE 4

| Ex. No. | 10 | 11 | 12 | 13 | 14 | C.6 | C.7 | C.8 |
|---|---|---|---|---|---|---|---|---|
| SILYLAMINE A | 5 | 1 | — | — | — | — | — | — |
| SILYLAMINE B | — | — | 3 | — | — | — | — | — |
| SILYLAMINE C | — | — | — | 4 | — | — | — | — |
| SILYLAMINE D | — | — | — | — | 4 | — | — | — |
| A-1120 | — | — | — | — | — | — | 3 | — |
| AMINE A | — | — | — | — | — | — | — | 3 |
| Adhesion (%) | 90 | 70 | 60 | 77 | 39 | 0 | 0 | 0 |
| 100% tensile | 0.61 | 0.67 | 0.69 | 0.38 | 0.41 | 0.45 | 0.75 | 0.77 |

TABLE 4-continued

| Ex. No. | 10 | 11 | 12 | 13 | 14 | C.6 | C.7 | C.8 |
|---|---|---|---|---|---|---|---|---|
| modulus (MPa) | | | | | | | | |
| Tensile strength at break (%) | 1.90 | 2.20 | 1.67 | 1.42 | 1.65 | 1.49 | 2.39 | 1.81 |
| Elongation at break (%) | 460 | 500 | 370 | 710 | 720 | 560 | 460 | 340 |

EXAMPLE 15

A curable composition was prepared in the same manner as in Example 10 except that a propyleneoxide polymer having 1.4 methyldimethoxysilyl groups (—Si(CH$_3$)(OCH$_3$)$_2$) on the average per one molecule and a number average molecular weight of 8000 was used in place of the propyleneoxide polymer having 2.1 methyldimethoxysilyl groups on the average per one molecule and a number average molecular weight of 17,000, and its properties were measured and evaluated in the same manners as in the previous Examples. The results are shown in Table 5.

EXAMPLE 16

A curable composition was prepared in the same manner as in Example 10 except that a mixture of a propyleneoxide polymer having 1.4 methyldimethoxysilyl groups on the average per one molecule and a number average molecular weight of 8000 (50 wt. parts) and a propyleneoxide polymer having 2.2 methyldimethoxysilyl groups on the average per one molecule and a number average molecular weight of 9000 (50 wt. parts) was used in place of the propyleneoxide polymer having 2.1 methyldimethoxysilyl groups on the average per one molecule and a number average molecular weight of 17,000, and its properties were measured and evaluated in the same manners as in the previous Examples except that five acryl urethane coatings for building use were used as the solvent type coatings, and four aqueous acrylic coatings were also used in the cross-cut test. The results are shown in Table 5.

COMPARATIVE EXAMPLE 9

A curable composition was prepared in the same manner as in Example 15 except that N-(β-aminoethyl)-γ-aminopropyltrimethoxysilane (A-1120) was used in place of SILYLAMINE A, and its properties were measured and evaluated. The results are shown in Table 5.

TABLE 5

| Example No. | 15 | 16 | C.9 |
|---|---|---|---|
| SILYLAMINE A | 5 | 5 | — |
| A-1120 | — | — | 3 |
| Adhesion: aqueous coating (%) | 100 | 100 | 55 |
| Adhesion: solvent type coating (%) | 48 | 67 | 0 |
| 100% Tensile modulus (MPa) | 0.18 | 0.21 | 0.23 |
| Tensile strength at break (MPa) | 1.04 | 1.05 | 1.36 |
| Elongation at break (%) | 710 | 820 | 740 |

What is claimed is:
1. A curable resin composition comprising:
(a) an oxyalkylene polymer having at least one silicon-containing reactive group in a molecule, and
(b) at least one compound selected from the group consisting of (b-1) a compound having at least one amino group and at least one trialkylsiloxy group in a molecule and (b-2) a silylamine having at least one group which has at least one group selected from the group consisting of a hydroxyl group, a hydrogen atom, a halogen atom, an alkoxy group, an acyloxy group, a ketoxymate group, an aminoxy group, a mercapto group, and alkenyloxy group bonded to the silicon atom and can be crosslinked through the formation of a siloxane bond.

2. A curable resin composition according to claim 1, wherein said oxyalkylene polymer has a backbone comprising a repeating unit of the formula (I):

—R$^1$—O— wherein R$^1$ is an alkylene group.

3. A curable resin composition according to claim 2, wherein R$^1$ in the formula (I) is a straight or branched alkylene group having 1 to 14 carbon atoms.

4. A curable resin composition according to claim 1, wherein said oxyalkylene polymer has a backbone comprising polypropyleneoxide.

5. A curable resin composition according to claim 1, wherein said silicone-containing reactive group is a group represented by the formula (II):

$$—(SiR^2{}_{2-a}X_aO)p—SiR^3{}_{3-b}X_b \quad (II)$$

wherein R$^2$ and R$^3$ are each an alkyl group having 1 to 20 carbon atoms, a cycloalkyl group having 3 to 20 carbon atoms, an aryl group having 6 to 20 carbon atoms, an aralkyl group having 7 to 20 carbon atoms or a triorganosiloxy group of the formula:

R$^4{}_3$SiO— in which each R$^4$ is a monovalent hydrocarbon group having 1 to 20 carbon atoms and three R$^4$ groups may be the same or different, provided that, when two or more R$^2$ or R$^3$ groups are present, they may be the same or different; each X is a hydroxyl or hydrolyzable group, provided that when two or more X groups are present, they may be the same or different; a is 0, 1 or 2; b is 0, 1, 2 or 3; and p is an integer of 0 to 19; with the proviso that "a" in the different repeating unit of the formula (III):

$$SiR^2{}_{2-a}X_aO \quad (III)$$

in the brackets may be the same or different, and the sum of all "a" and "b" is no less than 1.

6. A curable resin composition according to claim 1, which includes a compound (b-1).

7. A curable resin composition according to claim 1, which includes a compound (b-2).

8. A curable resin composition according to claim 1, further comprising a vinyl polymer having a silicon-containing reactive group.

9. A curable resin composition according to claim 1, wherein the compound (b) comprises a compound (b-1) of the formula (VII):

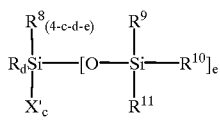

wherein R is an alkyl group having an amino group and 1 to 20 carbon atoms; $R^8$ is an alkyl group having 1 to 20 carbon atoms, an aryl group having 6 to 20 carbon atoms, an aralkyl group having 7 to 20 carbon atoms or a triorganosiloxy group of the formula:

$R^4SiO—$ in which $R^4$ is a monovalent hydrocarbon group having 1 to 20 carbon atoms provided that when two or more $R^8$ groups are present, they may be the same or different; X' is a hydroxyl or hydrolyzable group or a group of the formula:

$—O—SiQ_3$ in which Q is a hydroxyl or hydrolyzable group, a substituted or unsubstituted monovalent organic group having 1 to 20 carbon atoms or a triorganosiloxy group, provided that at least one of three Q groups is a hydroxyl or hydrolyzable group; $R^9$, $R^{10}$ and $R^{11}$ represent independently of one another a substituted or unsubstituted alkyl group having 1 to 6 carbon atoms or a phenyl group; and d and e are each 1 or 2 wherein $c+d+e \leq 4$.

10. A curable resin composition according to claim 1, wherein compound (b) comprises a compound selected from the group consisting of γ-aminopropyltrimethylsiloxydiethoxysilane, N-(β-aminoethyl)-γ-aminopropyltrimethylsiloxydimethoxysilane, N-(β-aminoethyl)-γ-aminopropyltrimethylsiloxymethylmethoxysilane, diethylene-triaminoproyltrimethylsiloxydimethoxysilane, and N,N-dimethyl-γ-aminopropyltrimethylsiloxydimethoxysilane.

11. A curable resin composition according to claim 1, wherein compound (b) comprises a compound (b-2) of the formula (VIII)

$$R^{12}_3Si—NR^{13}—R^{14}—SiR^3_{3-b}X_b \qquad (VIII)$$

wherein $R^3$ is an alkyl group having 1 to 20 carbon atoms, a cycloaklyl group having 3 to 20 carbon atoms, an aryl group having 6 to 20 carbon atoms, an aralkyl group having 7 to 20 carbon atoms or a triorganosiloxy group of the formula:

$R^4_3SiO—$ in which each $R^4$ is a monovalent hydrocarbon group having 1 to 20 carbon atoms and three $R^4$ groups may be the same or different, provided that, when two or more $R^3$ groups are present, they may be the same or different; each X is selected from the group consisting of a hydroxyl group, a hydrogen atom, a halogen atom, an alkoxy group, an acyloxy group, a ketoxymate group, an aminoxy group, a mercapto group, and an alkenyloxy group, provided that when two or more X groups are present, they may be the same or different; $R^{12}$ is a hydrogen atom, a substituted or unsubstituted alkyl group having 1 to 20 carbon atoms, a substituted or unsubstituted cycloalkyl group having 3 to 20 carbon atoms, an aryl group having 6 to 20 carbon atoms or an aralkyl group having 7 to 20 carbon atoms, provided that three $R^{12}$ groups may be the same or different; $R^{13}$ is a hydrogen atom, a substituted or unsubstituted alkyl group having 1 to 20 carbon atoms, a substituted or unsubstituted cycloalkyl group having 3 to 20 carbon atoms, an aryl group having 6 to 20 carbon atoms or an aralkyl group having 7 to 20 carbon atoms; and $R^{14}$ is a substituted or unsubstituted divalent hydrocarbon group; and b is 1, 2, or 3.

12. A curable resin composition according to claim 1, wherein compound (b) comprises a compound selected from the group consisting $Me_3SiNHC_3H_6Si(OEt)_3$, $Me_3SiNHC_3H_6Si(OMe)_3$, $Me_3SiNHC_2H_4NHC_3H_6Si(OMe)_3$, $Me_3SiNHC_2H_4—N(SiMe_3)C_3H_6Si(OMe)_3$, $Me_3SiNHC_2H_4NHC_3H_6SiMe(OMe)_2$, $Me_3SiNHC_2H_4—N(SiMe_3)C_3H_6SiMe(OMe)_2$, $Me_3SiNHC_2H_4NHC_2H_4NHC_3H_6Si(OMe)_3$, $Me_3SiNHC_2H_4N(SiMe_3)C_2H_4NHC_3H_6Si(OMe)_3$, $Me_3SiNHC_2H_4N(SiMe_3)C_2H_4—N(SiMe_3)C_3H_6Si(OMe)_3$, $Me_3,SiN(CH_2Ph)C_3H_6Si(OMe)_3$, $Me_3SiN(Ph)C_3H_6—Si(OMe)_3$, $(MeO)_3SiC_3H_6N(SiMe_3)C_2H_4NHC_3H_6Si(OMe)_3$, and $(MeO)_3SiC_3H_6—N(SiMe_3)C_2H_4N(SiMe_3)C_3H_6Si(OMe)_3$.

13. A curable resin composition according to claim 1, wherein the composition comprises 0.1 to 10 parts by weight of compound (b) per 100 parts by weight of polymer (a).

14. A method of coating comprising:
applying a coating to the surface of a cured material formed of a cured composition comprising
(a) an oxyalkylene polymer having at least one silicon-containing reactive group in a molecule, and
(b) at least one compound selected from the group consisting of (b-1) a compound having at least one amino group and at least one trialkylsiloxy group in a molecule and (b-2) a silylamine having at least one group which has at least one group selected from the group consisting of a hydroxyl group, a hydrogen atom, a halogen atom, an alkoxy group, an acyloxy group, a ketoxymate group, an aminoxy group, a mercapto group, and alkenyloxy group bonded to the silicon atom and can be crosslinked through the formation of a siloxane bond.

15. A coated material comprising a coating on a cured material, the cured material formed by curing a curable resin composition comprising:
(a) an oxyalkylene polymer having at least one silicon-containing reactive group in a molecule, and
(b) at least one compound selected from the group consisting of (b-1) a compound having at least one amino group and at least one trialkylsiloxy group in a molecule and (b-2) a silylamine having at least one group which has at least one group selected from the group consisting of a hydroxyl group, a hydrogen atom, a halogen atom, an alkoxy group, an acyloxy group, a ketoxymate group, an aminoxy group, a mercapto group, and alkenyloxy group bonded to the silicon atom and can be crosslinked through the formation of a siloxane bond.

* * * * *